United States Patent
Chen et al.

(10) Patent No.: US 10,698,538 B2
(45) Date of Patent: Jun. 30, 2020

(54) PRESSURE SENSING INPUT EQUIPMENT COMPRISING ELECTRODE LAYER COMPRISING PLURALITY OF PRESSURE SENSING ELECTRODES AND PLURALITY OF AXIAL TOUCH SENSING ELECTRODES

(71) Applicant: TPK Touch Solutions (Xiamen) Inc., Xiamen (CN)

(72) Inventors: Feng Chen, Fuzhou (CN); Jiayou He, Xiamen (CN); Liuyun Fang, Xiamen (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 0 days.

(21) Appl. No.: 15/206,305

(22) Filed: Jul. 10, 2016

(65) Prior Publication Data

US 2017/0010719 A1  Jan. 12, 2017

(30) Foreign Application Priority Data

Jul. 10, 2015 (CN) .......................... 2015 1 0404543

(51) Int. Cl.
*G06F 3/044* (2006.01)

(52) U.S. Cl.
CPC .... *G06F 3/044* (2013.01); *G06F 2203/04102* (2013.01); *G06F 2203/04103* (2013.01); *G06F 2203/04105* (2013.01); *G06F 2203/04106* (2013.01)

(58) Field of Classification Search
CPC ........... G06F 2203/04104–04106; G06F 3/044
See application file for complete search history.

(56) References Cited

U.S. PATENT DOCUMENTS

| 8,305,358 | B2 * | 11/2012 | Klinghult | G06F 3/0414 178/18.05 |
| 2006/0097991 | A1 * | 5/2006 | Hotelling | G06F 3/0416 345/173 |
| 2010/0128002 | A1 * | 5/2010 | Stacy | G06F 3/016 345/174 |
| 2010/0301879 | A1 * | 12/2010 | Philipp | G06F 3/03547 324/679 |
| 2012/0019473 | A1 * | 1/2012 | Edwards | G06F 3/044 345/174 |

(Continued)

*Primary Examiner* — Yuzhen Shen
(74) *Attorney, Agent, or Firm* — Cooper Legal Group, LLC

(57) ABSTRACT

A pressure sensing input equipment includes a first electrode layer, a second electrode layer, a first substrate, and a pressure sensing chip. The first substrate is disposed between the first electrode layer and the second electrode layer. The first electrode layer includes first pressure sensing electrodes and first axial touch sensing electrodes. The first pressure sensing electrodes and the first axial touch sensing electrodes are alternately arranged and insulated from each other and do not overlap. The first pressure sensing electrodes are applied for detecting pressure magnitude. The first pressure sensing electrodes include a first end part and a second end part. The pressure sensing chip is electrically connected to the pressure sensing electrodes, and the pressure sensing chip determines the pressure magnitude by detecting, the resistance variation of the pressure sensing electrodes after pressured. With such design, the pressure sensing input equipment can achieve better pressure magnitude detection.

20 Claims, 17 Drawing Sheets

(56) References Cited

U.S. PATENT DOCUMENTS

| | | | |
|---|---|---|---|
| 2012/0212434 A1* | 8/2012 | Bluemler | A61M 1/14 345/173 |
| 2013/0009905 A1* | 1/2013 | Castillo | G06F 3/044 345/174 |
| 2013/0141368 A1* | 6/2013 | Wang | G06F 3/044 345/173 |
| 2013/0147739 A1* | 6/2013 | berg | G06F 3/0488 345/173 |
| 2013/0181942 A1* | 7/2013 | Bulea | G06F 3/044 345/174 |
| 2014/0020484 A1* | 1/2014 | Shaw | G01L 1/146 73/862.625 |
| 2014/0085253 A1* | 3/2014 | Leung | G06F 3/0414 345/174 |
| 2014/0152618 A1* | 6/2014 | Ando | G06F 3/044 345/174 |
| 2014/0267128 A1* | 9/2014 | Bulea | G06F 3/044 345/174 |
| 2014/0293145 A1* | 10/2014 | Jones | G06F 1/1626 349/12 |
| 2014/0313169 A1* | 10/2014 | Kravets | G06F 3/044 345/178 |
| 2015/0002452 A1* | 1/2015 | Klinghult | G06F 3/0416 345/174 |
| 2015/0116260 A1* | 4/2015 | Hoen | G06F 3/0414 345/174 |
| 2015/0135857 A1* | 5/2015 | Kawamura | G01L 1/22 73/862.045 |
| 2015/0193055 A1* | 7/2015 | Ando | G06F 3/044 345/174 |
| 2015/0378493 A1* | 12/2015 | Kano | G06F 3/044 345/173 |
| 2016/0103545 A1* | 4/2016 | Filiz | G01L 1/18 345/174 |
| 2016/0139717 A1* | 5/2016 | Filiz | G01L 1/18 345/173 |
| 2016/0147352 A1* | 5/2016 | Filiz | G01L 1/18 345/173 |
| 2016/0147353 A1* | 5/2016 | Filiz | G01L 1/18 345/174 |
| 2016/0170543 A1* | 6/2016 | Kawamura | G06F 3/03547 345/174 |
| 2016/0195955 A1* | 7/2016 | Picciotto | G06F 3/044 345/174 |
| 2016/0231849 A1* | 8/2016 | Watazu | G06F 3/044 |
| 2016/0299625 A1* | 10/2016 | Kano | G06F 3/0414 |
| 2016/0342257 A1* | 11/2016 | Watazu | G06F 3/0414 |
| 2016/0357331 A1* | 12/2016 | Kano | G06F 3/044 |
| 2016/0378256 A1* | 12/2016 | Lee | G06F 3/041 345/174 |

* cited by examiner

PRESSURE SENSING INPUT EQUIPMENT COMPRISING ELECTRODE LAYER COMPRISING PLURALITY OF PRESSURE SENSING ELECTRODES AND PLURALITY OF AXIAL TOUCH SENSING ELECTRODES

RELATED APPLICATIONS

This application claims priority to Chinese Application Serial Number 201510404543.4, filed on Jul. 10, 2015, which is herein incorporated by reference.

BACKGROUND

Field of Disclosure

The present disclosure relates to input equipments. More particularly, the present disclosure relates to a pressure sensing input equipment.

Description of Related Art

According to the technology development, touch panels have been widely used in several commercial electrical devices, such as smart phones, tablet computers, cameras, e-books. MP3 players, smart watches, such mobile electrical products, or displays applied to operate controlling devices. Electrical products have been gradually indispensable in our daily life.

Due to the continuous development of the touch panel technologies, the multi-function touch panels have significant advantages. Especially, the panels that can perform touch sensing and pressure sensing will receive more and more support from the users in the future. Conventional design of pressure sensing electrode usually includes an electrode layer disposed on another substrate, which is apart from the touch module, for pressure sensing. Then, the substrate and the touch module is attached together to obtain a touch panel that can detect pressure. Such touch panel is thicker and cost larger, which is not satisfied to the modern cell phones that are light and thin. However, if the touch sensing electrodes and the pressure sensing electrodes are formed on a single surface, a complicated bridging structure must be assembled, and reduces product yield. Also, a single surface, which contains the touch electrodes and the pressure electrodes, has limited space. Once the pressure electrodes occupy a large space, the distribution density of the touch electrodes will be affected, thereby influencing the entire accuracy and experience of the users. Based on above issues in technology, how to keep products light, thin, and still reduce manufacture difficulty is a person skilled in this art concerns about.

SUMMARY

To overcome the current problem that it is hard to manufacture a touch panel with functions of pressure sensing and touch sensing, the present disclosure provides a pressure sensing input equipment that can keep products light, thin and still reduce manufacture difficulty.

To solve the technical problems, the present disclosure provides a pressure sensing input equipment, including a first electrode layer, a second electrode layer, a first substrate, and a pressure sensing chip. The first substrate is located between the first electrode layer and the second electrode layer. The first electrode layer includes a plurality of first pressure sensing electrodes and a first axial touch sensing electrodes. The first pressure sensing electrodes and the first axial touch sensing electrodes are alternately arranged, and are insulated from each other and do not overlap. The first pressure sensing electrodes are applied for sensing pressure magnitude. The first pressure sensing electrodes include a first end part and a second end part opposite to the first end part. The pressure sensing chip is electrically connected to the first pressure sensing electrodes, and the pressure sensing chip determines the pressure magnitude by detecting resistance variation of the first pressure sensing electrodes after pressured.

DETAILED DESCRIPTION

To simplify the purposes, technologies, and advantages of the present disclosure, detail descriptions are followed with several figures and embodiments. It is noted that the described embodiments herein are merely used to explain but not to limit the present disclosure.

Figure 1:
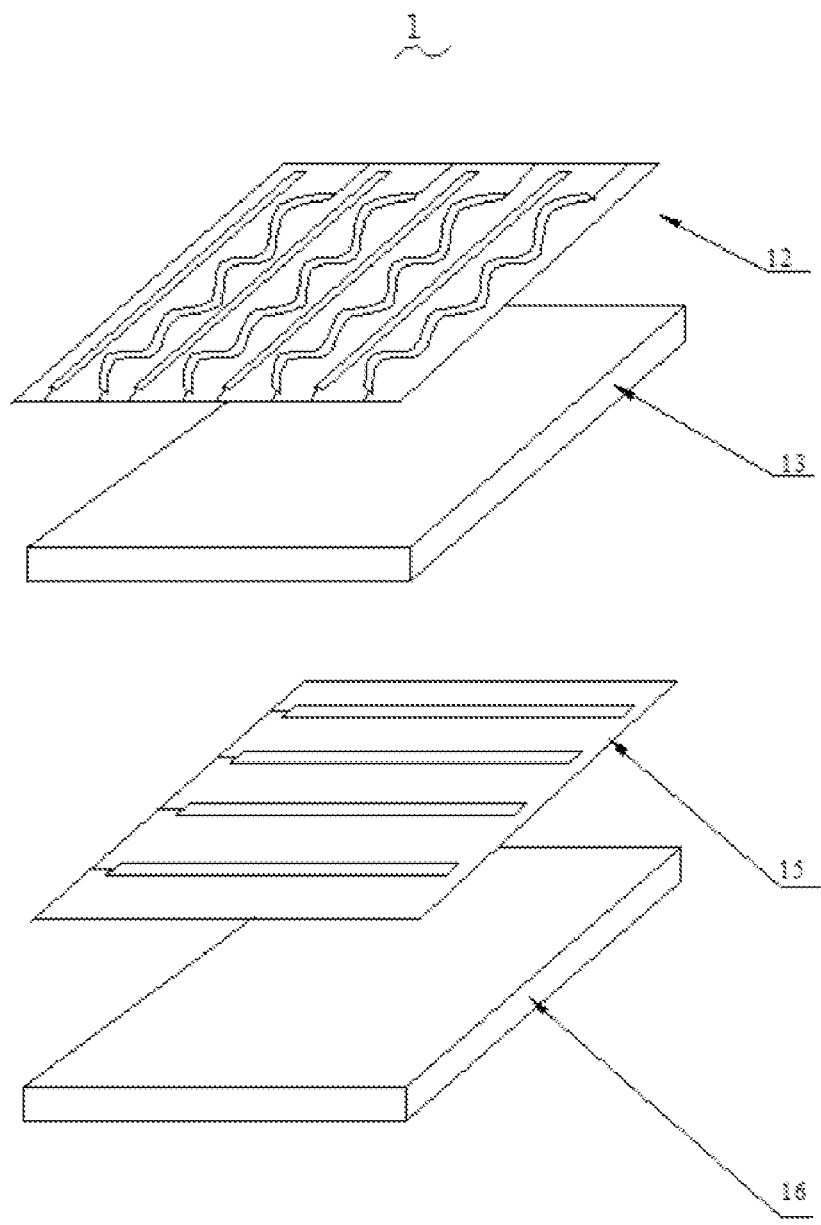
FIG. 1 is an explosion view of a pressure sensing input equipment according, to some embodiments of the present disclosure.

Referring to FIG. 1, FIG. shows a pressure sensing input equipment 1 of the present disclosure. The pressure sensing, input equipment 1 includes a first substrate 13, a second substrate 16, a first electrode layer 12, and a second electrode layer 15. The first electrode layer 12 is formed on the first substrate 13. The second electrode layer 15 is formed on the second substrate 16. When an external pressure is applied, the first electrode layer 12 and the second electrode layer 15 react correspondingly. Different touch strengths make the first electrode layer 12 and the second electrode layer 15 produce different corresponding actions, thereby achieving different operation. Such design can greatly increase experience and satisfaction of the users. The materials of the first electrode layer 12 and the second electrode layer 15 may be ITO, and may further be silver nanowire, copper nanowire, graphene poly (3,4-ethylenedioxythiophene) (PEDOT): polystyrene sulfonate (PSS) transparent conductive polymer, carbon nanotube and the like. The materials of the first substrate 13 and the second substrate 16 may be hard material, such as glass, tempered glass, sapphire glass and so; soil material, such as polyetheretherketone (PEEK), polyimide (PI) polyethylene terephthalate (PET), Polycarbonate (PC), polymethylmethacrylate (PMMA), poly ethylene succinate (PES), or the combination thereof.

Figure 2:
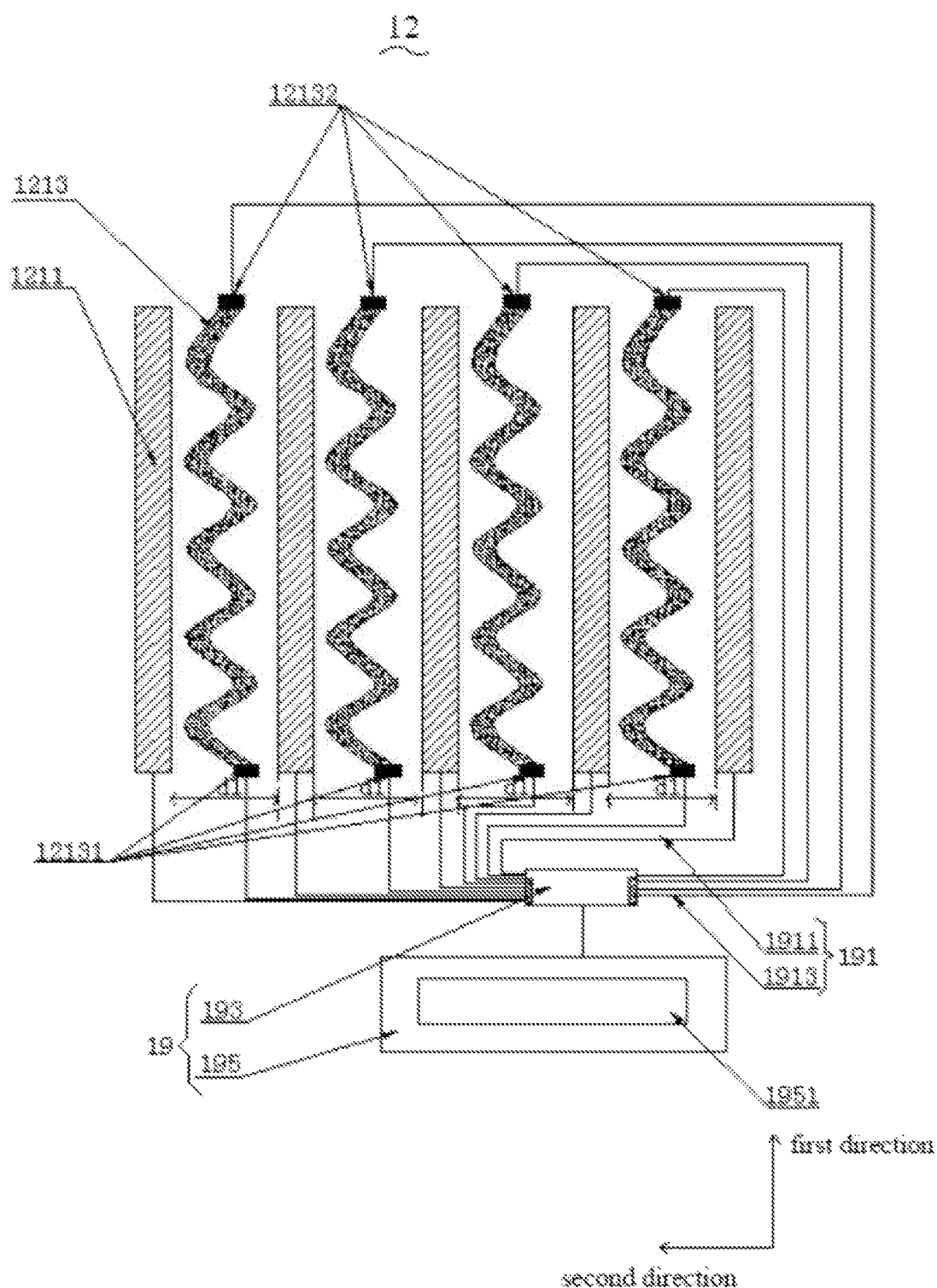
FIG. 2 is a front view of an electrode unit in a first electrode layer of the pressure sensing input equipment according to FIG. 1.

Referring to FIG. 2, the first electrode layer 12 according to some embodiments of the present disclosure includes a plurality of first axial sensing electrodes 1211 and a plurality of first pressure sensing electrode 1213. The first axial sensing electrodes 1211 are linearly arranged, and uniformly spaced. The distance between two adjacent first axial sensing electrodes 1211 is d1. The first pressure sensing electrodes 1213 are disposed between two of the first axial sensing electrodes 1211, and the first pressure sensing electrodes 1213 are arranged in spring shape. The first pressure sensing electrodes 1213 and the first axial sensing electrodes 1211 do not contact each other to avoid signal interference. The first pressure sensing electrodes 1213 arranged in spring shape can greatly increase the deformation ability and are good for detecting external pressure, further improving detecting accuracy. To provide sufficient space for arranging the first pressure sensing electrodes 1213 and obtain larger resistance variation, in the manufacturing process, the wire width of the first axial touch sensing electrodes 1211 may be adequately reduced. The wire width of the first pressure sensing electrodes 1213 is controlled to be smaller than that of the first axial touch sensing electrodes 1211. Such design can provide the first pressure sensing electrodes 1213 with arranging space, such that the first pressure sensing electrodes 1213 are better for sensing pressure. Generally, the wire width of the first pressure sensing electrodes 1213 ranges from 5 μm to 300 μm. Each of the first pressure sensing electrodes 1213 includes a first end part 12131 and a second end part 12132 opposite to the first end part 12131.

In some embodiments, the pressure sensing input equipment 1 further includes an electrical system 19. The electrical system 19 includes a plurality of electrode connecting wires 191, a flexible printed circuit (FPC) 193, and a pressure sensing chip 195. The electrode connecting wires 191 are separated into a plurality of first wires 1911 and a plurality of second wires 1913. One end of each of the first wires 1911 is connected to the FPC 193, and another end of each of the first wires 1911 is connected to the first end part 12131 of the first pressure sensing electrodes 1213. Similarly, one end of each of the second wires 1913 is connected to the FPC 193, and another end of each of the second wires 1913 is connected to the second end part 12132 of the first pressure sensing electrodes 1213. The first wires 1911, the second wires 1913, and the first pressure sensing electrodes 1213 are electrically connected.

The materials of the first wires 1911 and the second wires 1913 are not limited to ITO, but may also be transparent silver nanowire, copper nanowire, graphene, poly (3,4-ethylenedioxythiophene) (PEDOT): polystyrene sulfonate (PSS) transparent conductive polymer, carbon nanotube, graphene, or the like. At least two sides of the first substrate 13 and the second substrate 16 can be frameless design, thereby obtaining a frameless pressure sensing input equipment.

Figure 3:
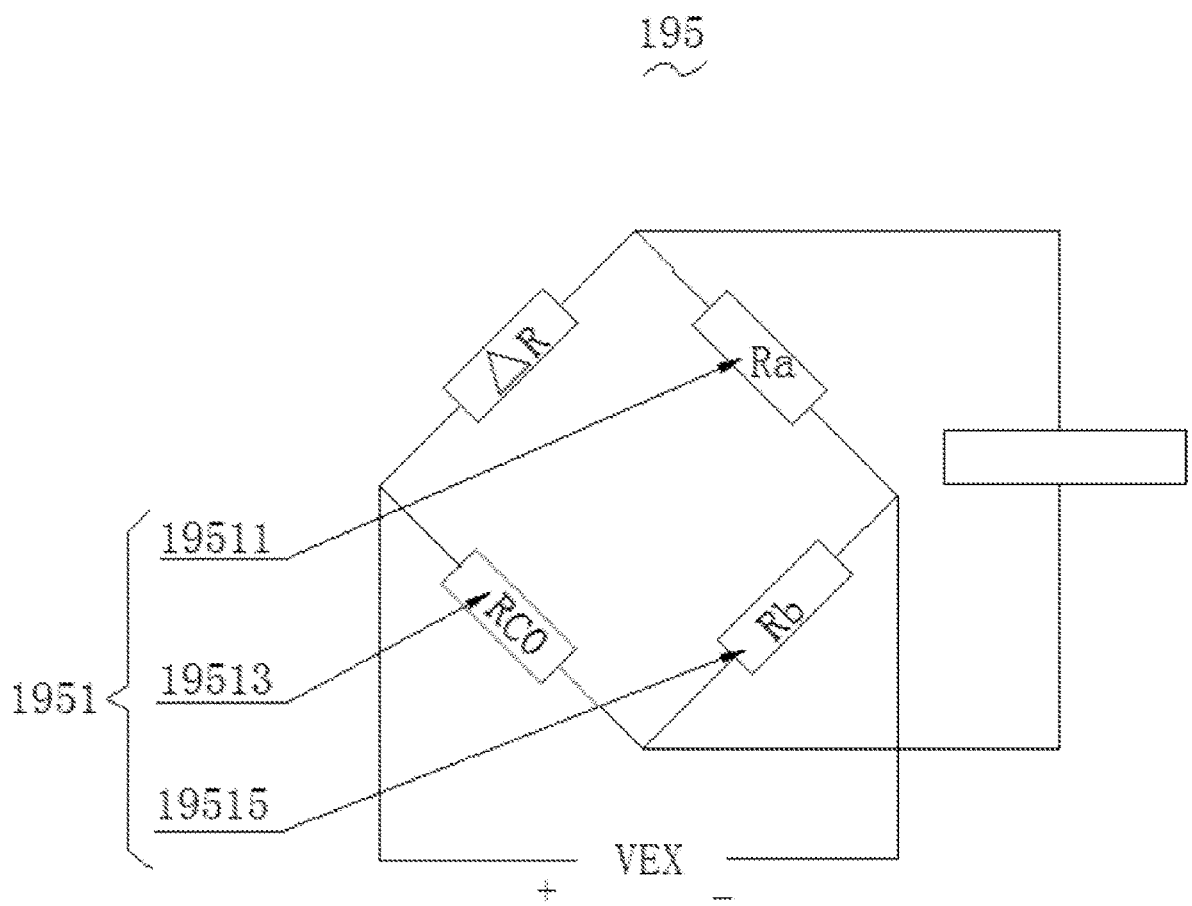
FIG. 3 is an electronic schematic view of a pressure sensing chip of the pressure sensing input equipment according to FIG. 1.

Reference is made to FIG. 3. In the present disclosure, the pressure sensing chip 195 of the pressure sensing input equipment 1 can perform signal processing to resistance variation of the first pressure sensing electrodes 1213, and further detects external pressure magnitude more accurately, thereby outputting various control signals. After the first pressure sensing electrodes 1213 induce resistance variation, since that auxiliary resistors 19511, 19515, and 19513 of a Wheatstone bridge circuit 1951, and the first pressure sensing electrodes 1213 are disposed in series-parallel and induce resistance variation, signal variation induced by the resistance variation is processed by the Wheatstone bridge circuit 1951 and then transferred to the pressure sensing chip 195. Here the $\Delta R$ in the figure is the resistance variation of the pressure sensing chip 195. Since the resistance variation of the pressure sensing chip 195 is relatively small after pressured, in order to make the following signal analysis and processing easier, here, after the Wheatstone bridge circuit 1951 detects the resistance variation of the first pressure sensing electrodes 1213, another module circuit 1952 of the pressure sensing chip 195 will perform signal amplification, or the like.

After the pressure sensing input equipment 1 is applied by a touch, the pressure sensing input equipment 1 performs pressure sensing according to the resistance variation, which is induced by the shape deformation of the first pressure sensing electrodes 1213. Since the first pressure sensing electrodes 1213 are connected to the FPC 193 by the electrodes connecting wires 191, the signal of resistance variation of the first pressure sensing electrodes 1213 passes through the FPC 193 and is transmitted to the pressure sensing chip 195 through the Wheatstone bridge circuit 1951, thereby achieving pressure sensing. Generally, the shape deformation and the resistance variation of the first pressure sensing electrodes 1213 satisfy the following formula: $GF=(\Delta R/R)/(\Delta L/L)$, where the GF is gage factor, R is an initial value of the pressure sensing electrodes 1315, L is a total length of the corresponding wire of the pressure sensing electrodes 1315, $\Delta R$ is resistance variation of the first pressure sensing electrodes 1213, and $\Delta L$ is wire length variation. In the situation that GF, R, and L remain constant, the larger the wire length variation $\Delta L$ is, the easier the resistance variation $\Delta R$ can be detected. To obtain a better sensing effect, GF is larger than 0.5.

Figure 4:
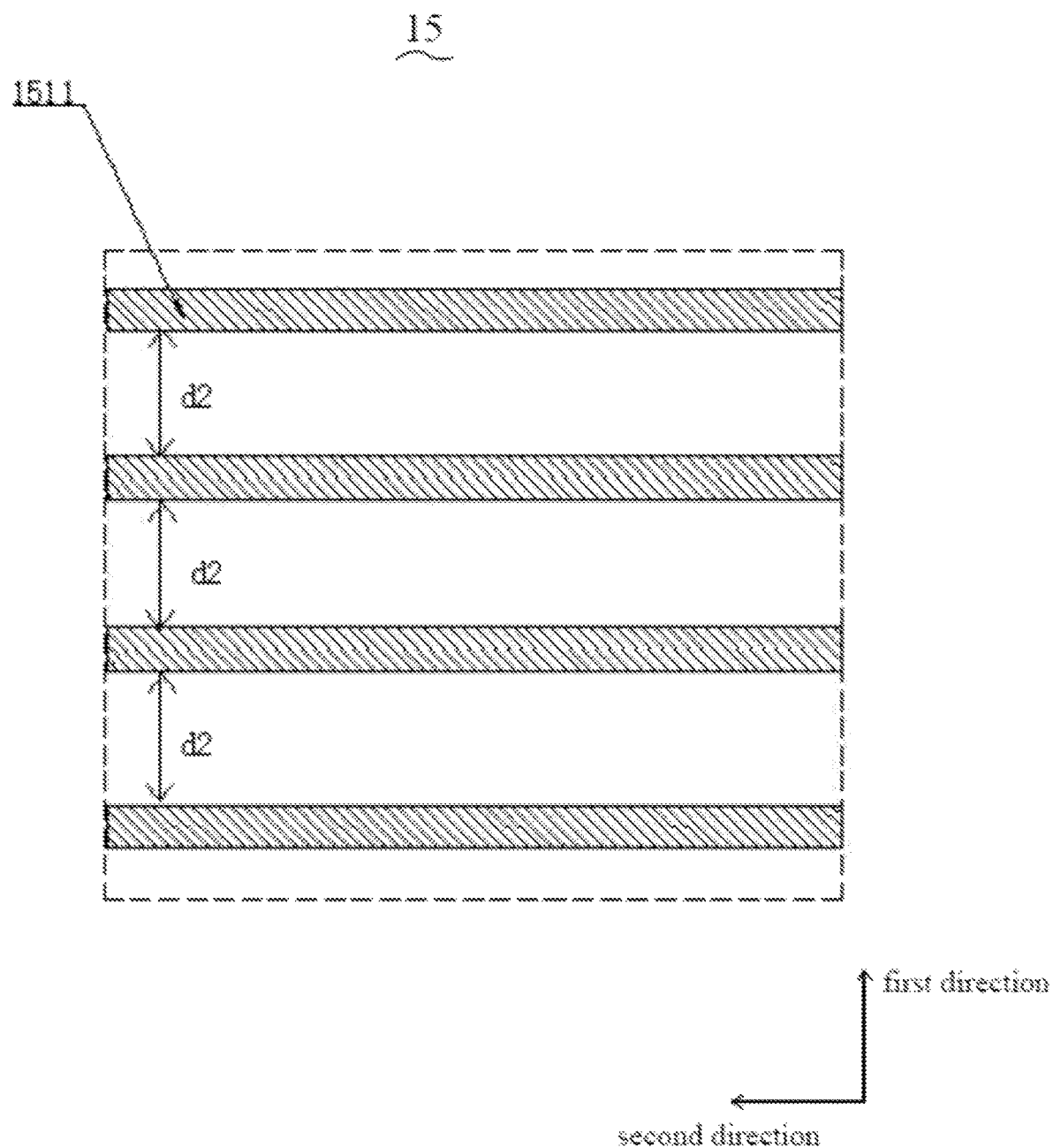
FIG. 4 is a front view of an electrode unit in a second electrode layer of the pressure sensing input equipment according to FIG. 1.
Figure 5:
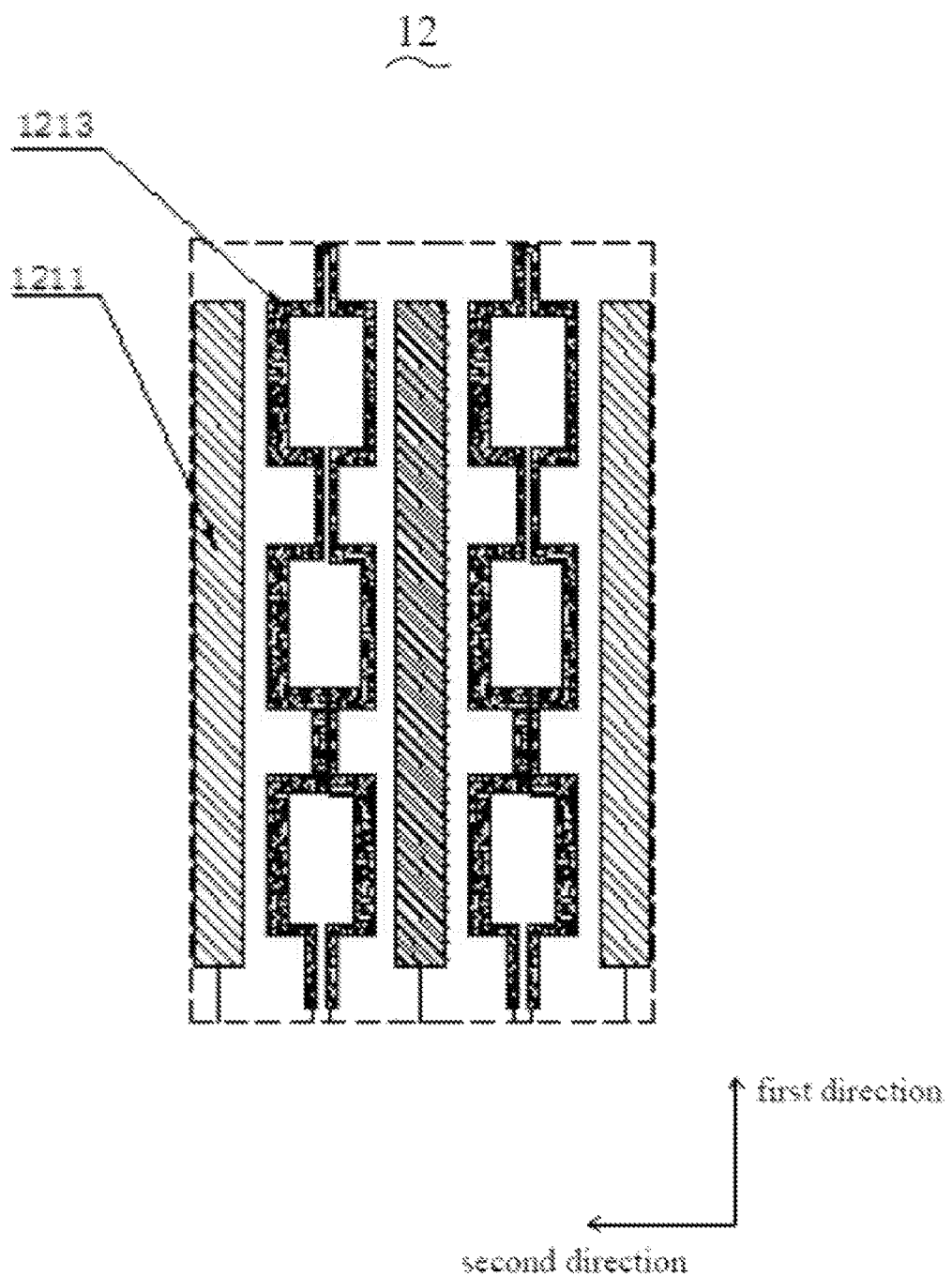
FIG. 5 to FIG. 9 are front views of other deformation structures of electrode units in the first electrode layer of the pressure sensing input equipment according to FIG. 1.
Figure 6:
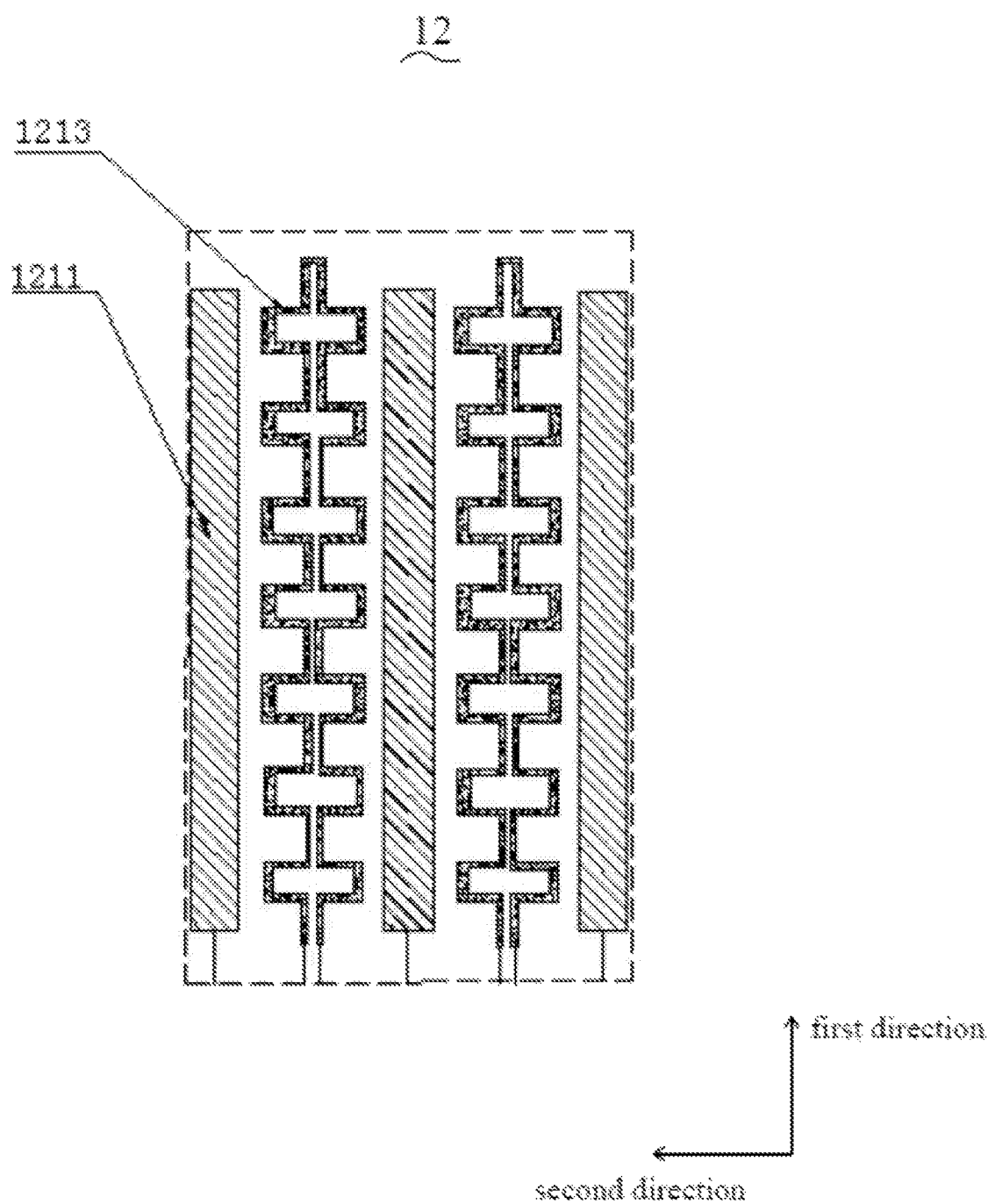
Figure 7:
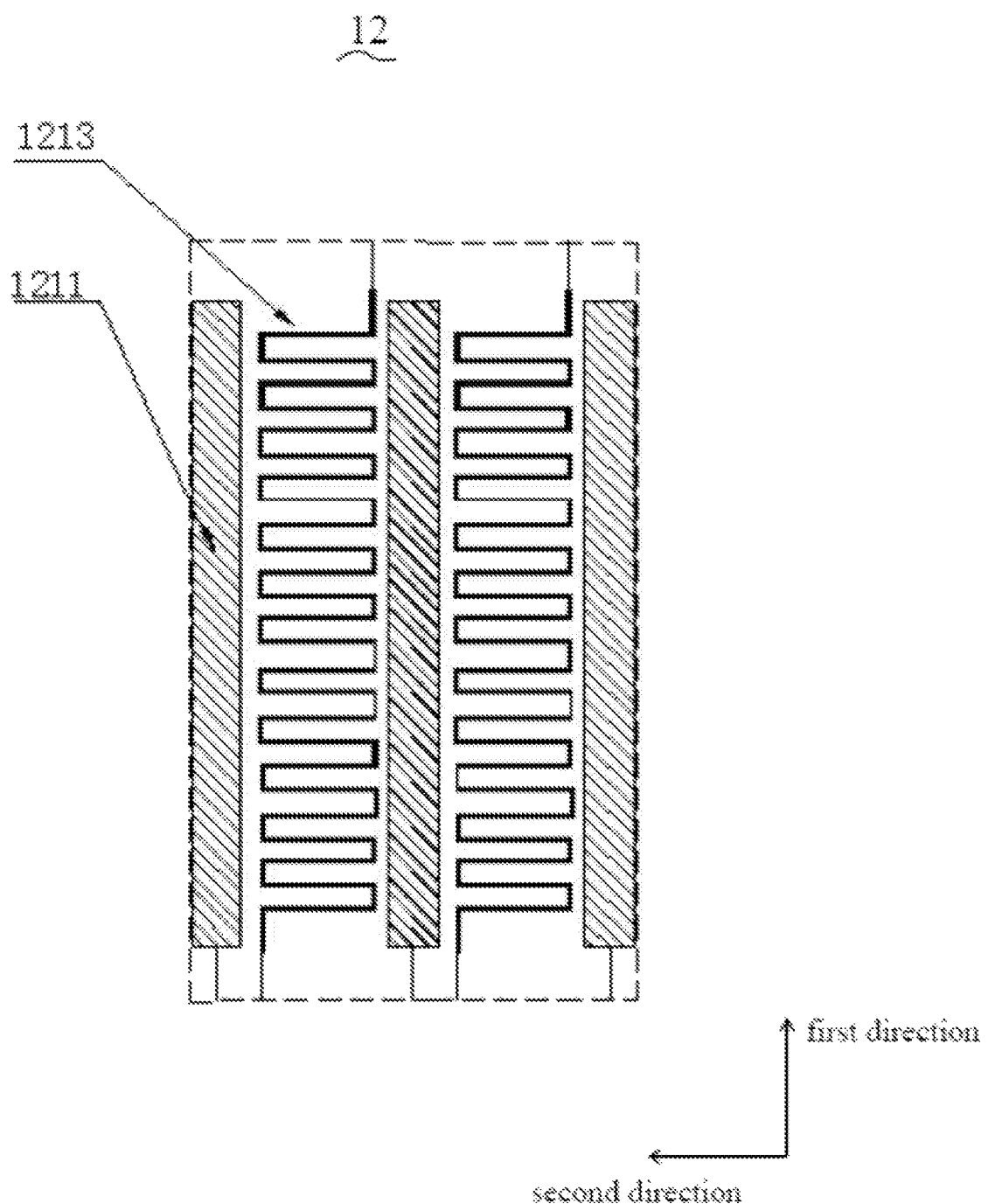
Figure 8:
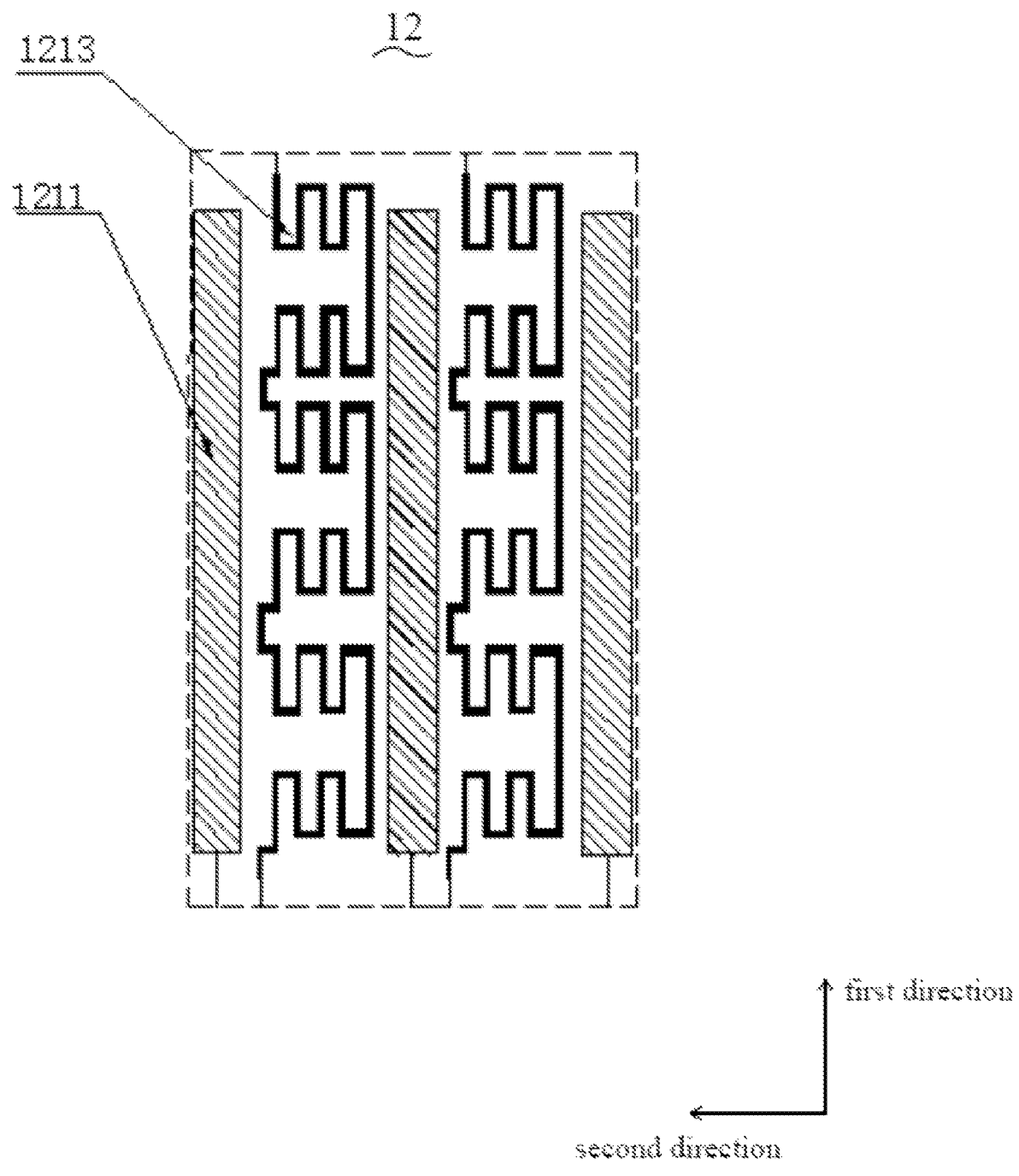
Figure 9:
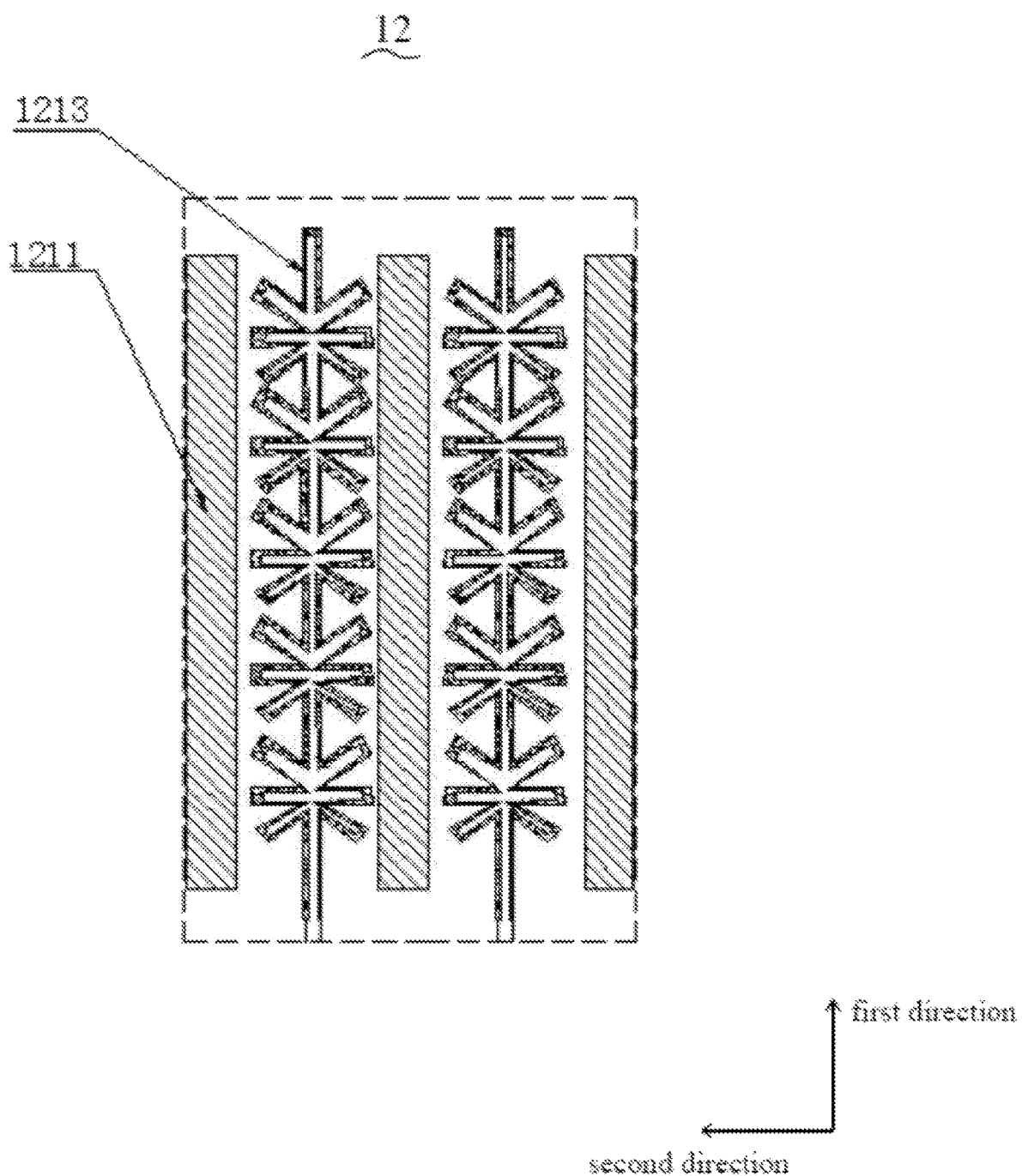

Referring to FIG. 4, the second electrode layer 15 of the pressure sensing input equipment 1 according to the some embodiments of the disclosure includes a plurality of second axial touch sensing electrodes 1511. The second axial touch sensing electrodes 1511 are linearly arranged along the second direction, and are uniformly spaced. The distance between two adjacent second axial touch sensing electrodes 1511 is d2.

Without the first pressure sensing electrodes 1213, the wire width of the first axial touch sensing electrodes 1211 is equal to the wire width of the second axial touch sensing electrodes 1511, and the distance between two of the first axial touch sensing electrodes 1211 is equal to the distance between two of the second axial touch sensing electrodes 1511. Since the first pressure sensing electrodes 1213 are additionally disposed, the distance between two of the first axial touch sensing electrodes 1211 is extended, and the wire width of the first axial touch sensing electrodes 1211 are reduced correspondingly. Therefore, the distance between adjacent two of the first axial touch sensing electrodes 1211 is larger than the distance between adjacent two of the second axial touch sensing electrodes 1511. That is, the distance d1 is larger than the distance d2. The first axial touch sensing electrodes 1211 and the second axial touch sensing electrodes 1511 are applied for detecting multipoint touch positions.

Referring to FIG. 5 to FIG. 9, the first pressure sensing electrodes 1213 may also be continuous rectangles, cross, tortuous path, shift pattern, or radial shape.

Figure 10:
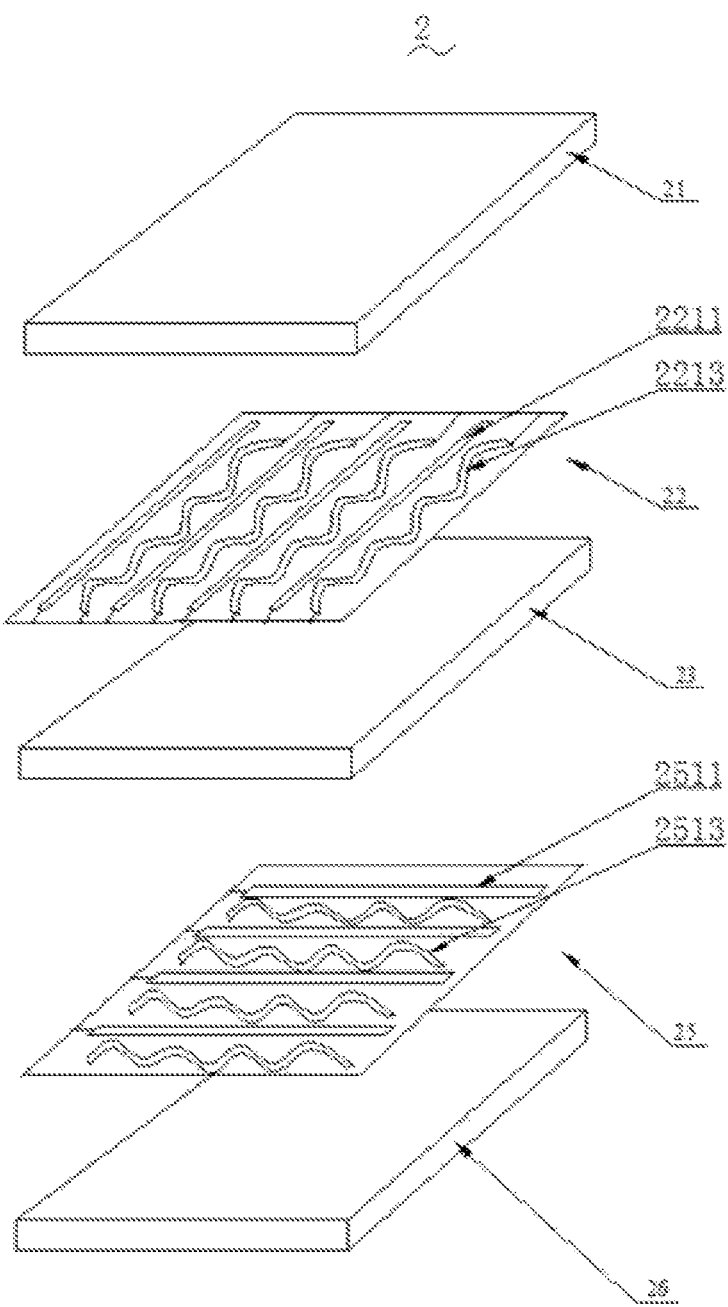
FIG. 10 is an explosion view of a pressure sensing input equipment according to some embodiments of the present disclosure.

Referring to FIG. 10, a pressure sensing input equipment 2 according to some embodiments of the present disclosure includes a protective board 21, a first electrode layer 22, a first substrate 23, a second electrode layer 25, and a second substrate 26. The protective board 21 includes: a first surface and a second surface, and the first surface and the second surface are disposed oppositely. The first surface is an operation surface. The materials of the protective board 21 may be hard plastic, tempered glass, $Al_2O_3$, or such strengthened hard boards. The first electrode layer 22 is located between the protective board 21 and the first substrate 23. The first electrode layer 22 includes a plurality of first axial sensing electrodes 2211 and a plurality of first pressure sensing electrode 2213. The first axial sensing electrodes 1211 are linearly arranged, and are equally spaced apart. The first pressure sensing electrodes 2213 are disposed between adjacent two of the first axial sensing electrodes 2211, and the first pressure sensing electrodes 1213 are arranged in spring shape. The first pressure sensing electrodes 2213 and the first axial sensing electrodes 2211 do not contact each other. The second electrode layer 25 includes a plurality of second axial touch sensing electrodes 2511 and a plurality of second pressure sensing electrodes 2513. The shape of the first axial touch sensing electrodes 2211 is the same as that of the second axial touch sensing electrodes 2511, and the shape of the first pressure sensing electrodes 2213 is the same as that of the second pressure sensing electrodes 2513. The first pressure sensing electrodes 2213 are disposed in the first electrode layer 22, and the second pressure sensing electrodes 2513 are disposed in the second electrode layer 25. With such design, the pressure sensing input equipment 2 provides prominent detecting function, more detecting accuracy, and more satisfaction of users.

Figure 11:
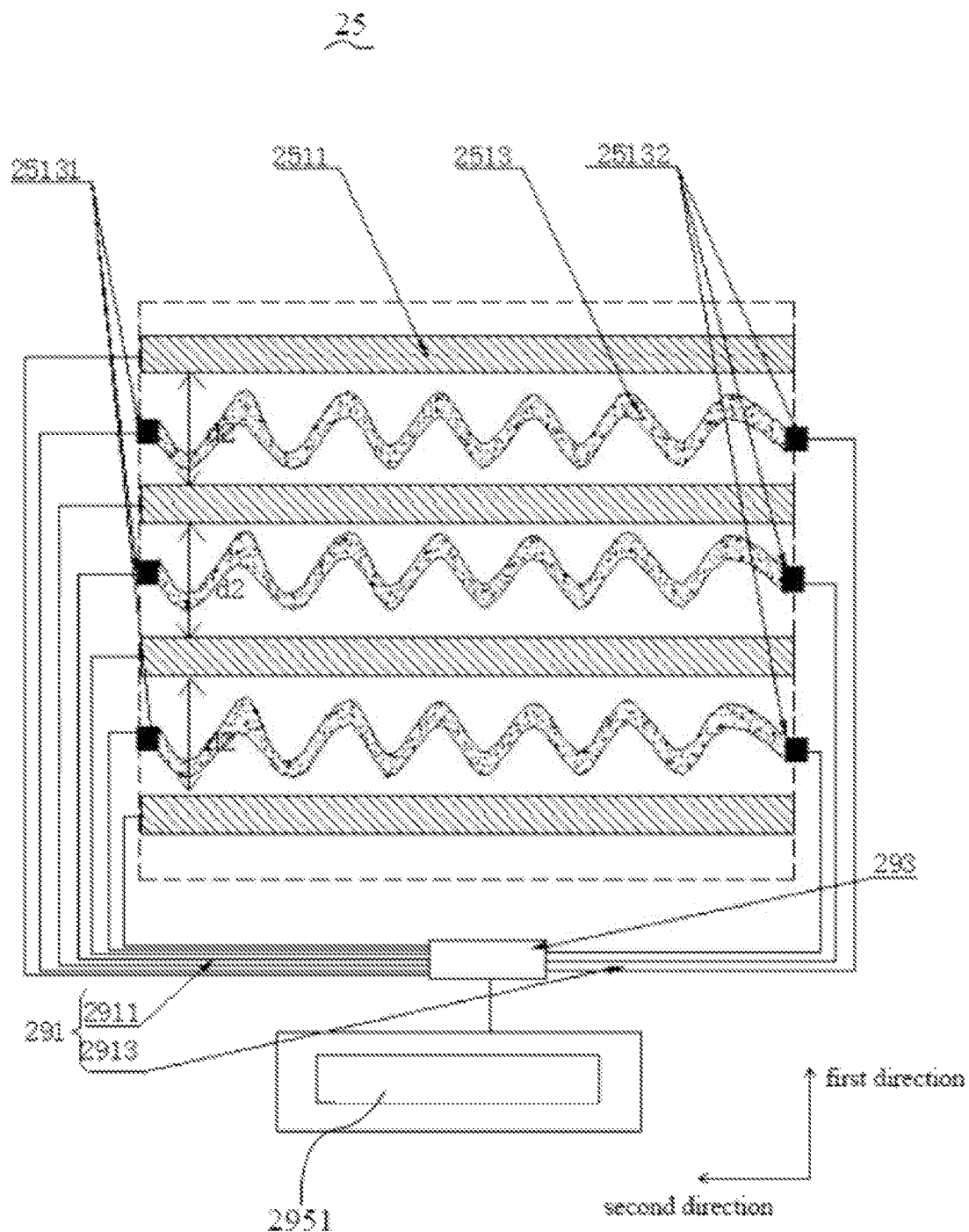
FIG. 11 is a front view of an electrode unit in a second electrode layer of the pressure sensing input equipment according to some embodiments of the present disclosure.

Referring to FIG. 11, the second electrode layer 25 of the pressure sensing input equipment according to the some embodiments of the present disclosure includes a plurality of second axial touch sensing, electrodes 2511 and a plurality of second pressure sensing electrodes 2513. Each of the second pressure sensing electrodes 2513 is arranged in spring shape and includes a third end part 25131 and a fourth end part 25132. A plurality of electrode connecting wires 291 includes a plurality of third wires 2911 and a plurality of fourth wires 2913. One end of each of the third wires 2911 is connected to the FPC 293, and another end of each of the first wires 1911 is connected to the third end part 25131 of the second pressure sensing electrodes 2513. Similarly, one end of each of the fourth wires 2913 is connected to the FPC 293, and another end of each of the fourth wires 2913 is connected to the fourth end part 25132 of the second pressure sensing electrodes 2513. The third wires 2911, the fourth wires 2913, and the second pressure sensing electrodes 2513 are electrically connected. The wire width of the second pressure sensing electrodes 2513 ranges from 5 μm to 300 μm. The Wheatstone bridge circuit 2951 detects the resistance variation of the pressure sensing electrodes after pressured.

Figure 12:
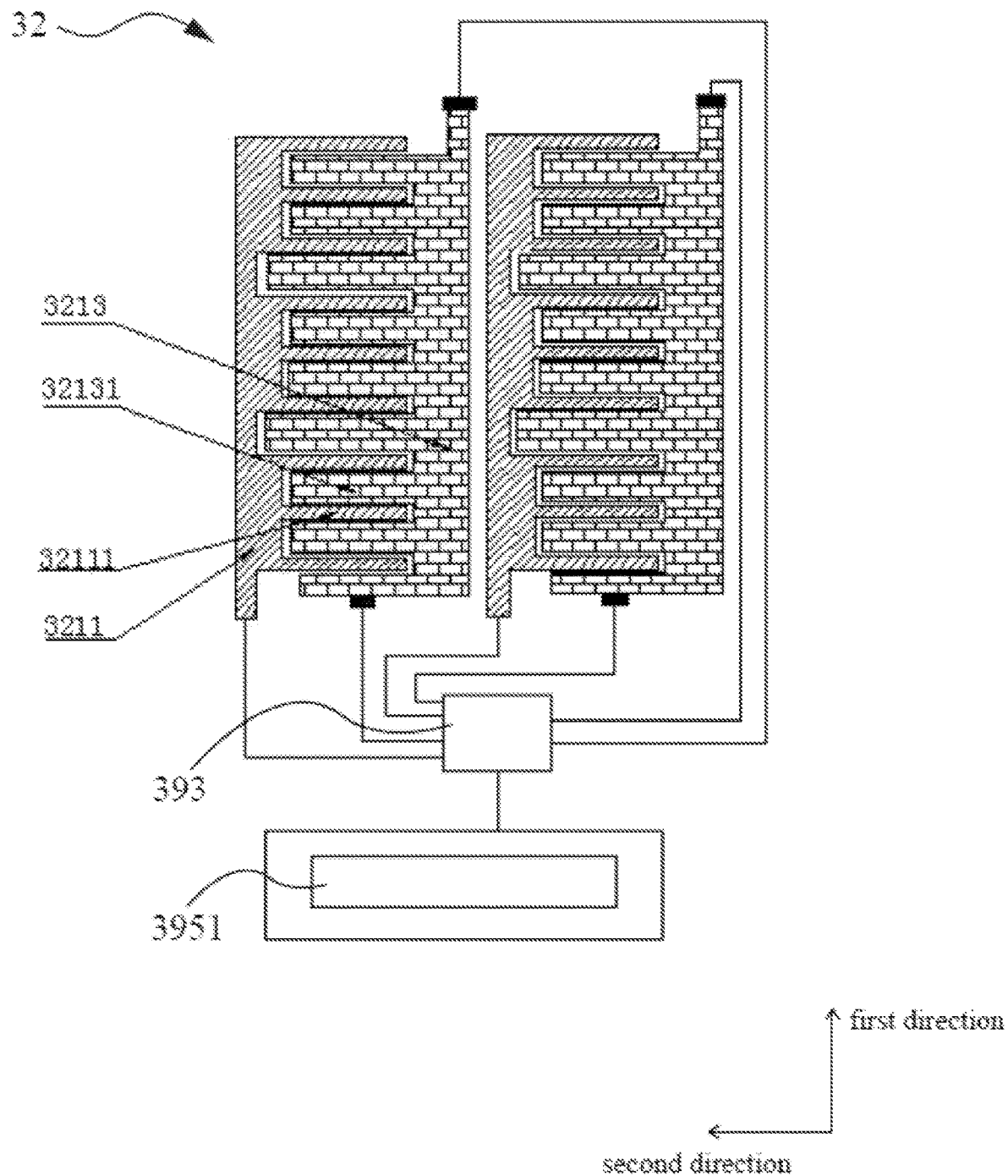
FIG. 12 is a front view of an electrode unit in a first electrode layer of the pressure sensing input equipment according to some embodiments of the present disclosure.

Referring to FIG. 12, a first electrode layer 32 of a pressure sensing input equipment 3 according to some embodiments of the present disclosure includes a plurality of first axial touch sensing electrodes 3211 and a plurality of first pressure sensing electrodes 3213. The first axial touch sensing electrodes 3211 include a plurality of first axial touch sensing electrode projection parts 32111 along the second direction, and the first pressure sensing electrodes 3213 include a plurality of first pressure sensing electrode projection parts 32131 along the second direction. Each of the first axial touch sensing electrodes 3211 and each of the first pressure sensing electrodes 3213 are complementarily interleaved. The first axial touch sensing electrode projection parts 32111 and the first pressure sensing electrode projection parts 32131 are alternately arranged, forming a complementary structure. The number of the first axial touch sensing electrode projection parts 32111 and the number of the first pressure sensing electrode projection parts 32131 are not limited in the disclosure. The first electrode layer 32 is connected to a FPC 393 by wires, and a Wheatstone bridge circuit 3951 detects resistance variation of the pressure sensing electrodes after pressured.

The first axial touch sensing electrodes 3211 and the first pressure sensing electrodes 3213, which are complementarily interleaved, can increase the area of the first axial touch sensing electrodes 3211 and the area of the first pressure sensing electrodes 3213. Such arrangement is good for detecting touch position and further good for sensing pressure magnitude.

Figure 13:
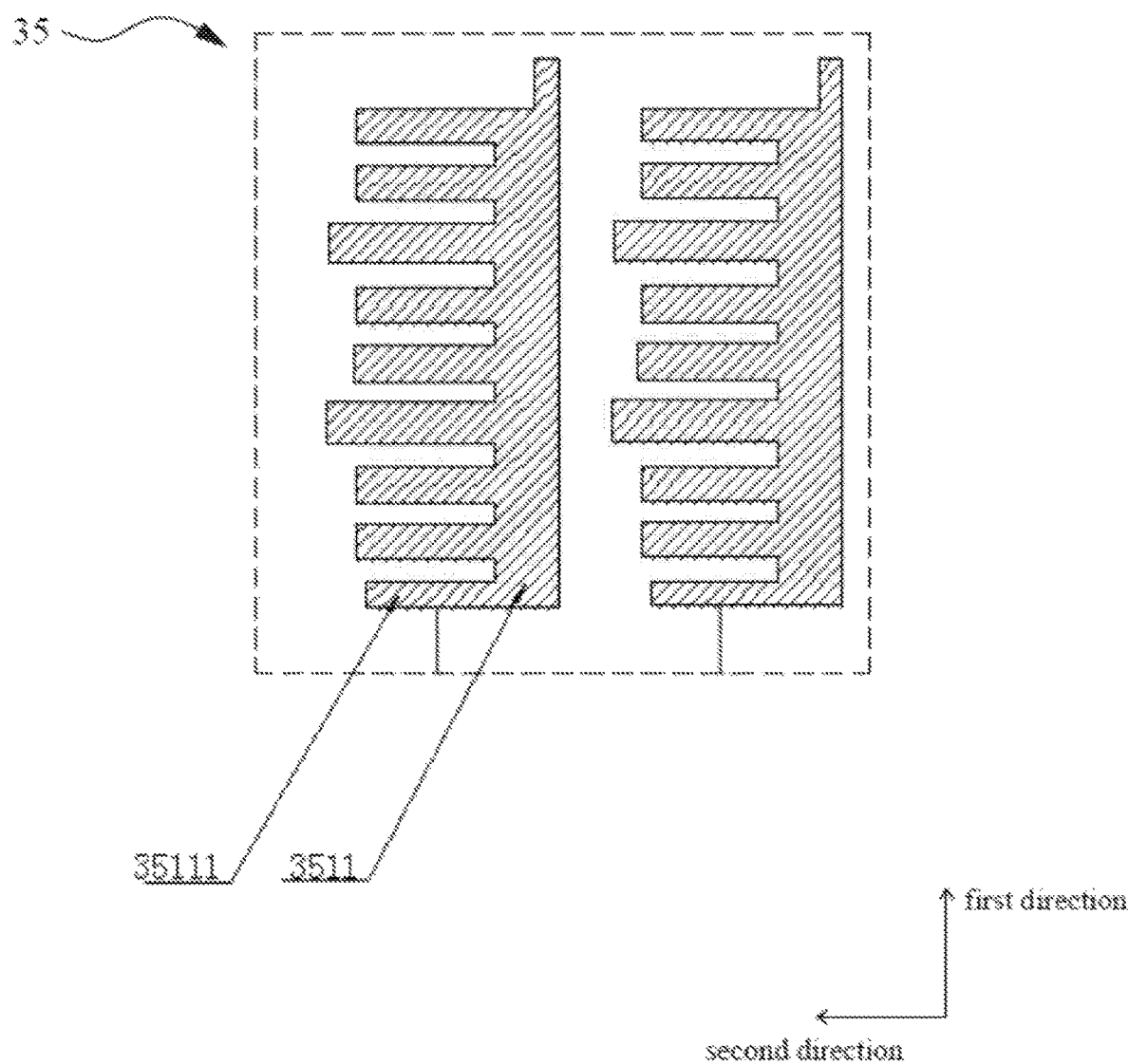
FIG. 13 is a front view of an electrode unit in a second electrode layer of the pressure sensing input equipment according to some embodiments of the present disclosure.

Referring to FIG. 13, a second electrode layer 35 of the pressure sensing input equipment 3 according to some embodiments of the present disclosure includes a plurality of second axial touch sensing electrodes 3511. Each of the second axial touch sensing electrodes 3511 includes a plurality of second axial touch sensing electrode projection parts 35111 along to the second direction.

In the first electrode layer 32, the first axial touch sensing electrodes 3211 and the first pressure sensing electrodes 3213 are complementarily interleaved, and with the second axial touch sensing electrodes 3511 of the second electrode layer 35, a light, thin products can be achieved, and wiring difficulty can be greatly reduced. When a user touches a protective board 31, the applied strength is transmitted to the first electrode layer 32, resulting in shape deformation of the first pressure sensing electrodes 3213 within the first electrode layer 32, and further leads to a resistance variation. The touch applied by the user can also induce a capacitance variation of the first axial touch sensing electrodes 3211 and the second axial touch sensing electrodes 3511, thereby detecting the information of the touch position.

Figure 14:
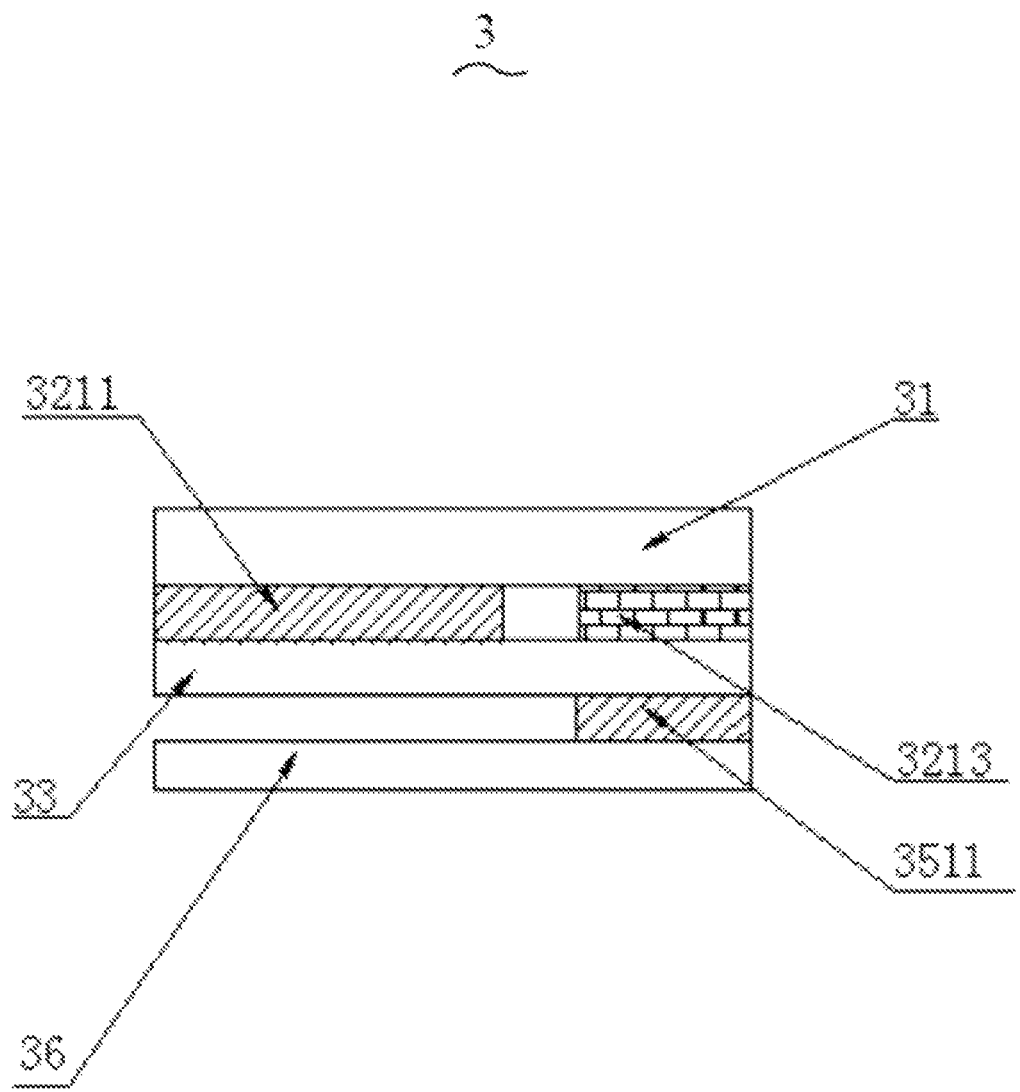
FIG. 14 is a cross-sectional view of the pressure sensing input equipment according to some embodiments of the present disclosure.

Reference is made to FIG. 14. In a cross-sectional view of the pressure sensing input equipment 3 according to some embodiments of the present disclosure, the first axial touch sensing electrodes 3211 and the first pressure sensing electrodes 3213, which are both located between the cover board 31 and the first substrate, are complementarily interleaved. The corresponding second axial touch sensing electrodes 3511 are present between the first substrate 33 and the second substrate 36, and the cross-sectional area of the second axial touch sensing electrodes 3511 is equal to that of the first axial touch sensing electrodes 3211.

The first axial touch sensing electrodes 3211 and the first pressure sensing electrodes 3213 are arranged on the same surface and are complementarily interleaved, thereby balancing the first axial touch sensing electrodes 3211 and the first pressure sensing, electrodes 3213. Generally, the area of the first pressure sensing electrodes 3213 is 70% to 80% the area of the first axial touch sensing electrodes 3211. Such design neither affects the first axial touch sensing electrodes 3211 for determining the touch position with induced capacitance variation, nor affects the detecting accuracy of shape deformation by the first pressure sensing electrodes 3213.

Figure 15A:
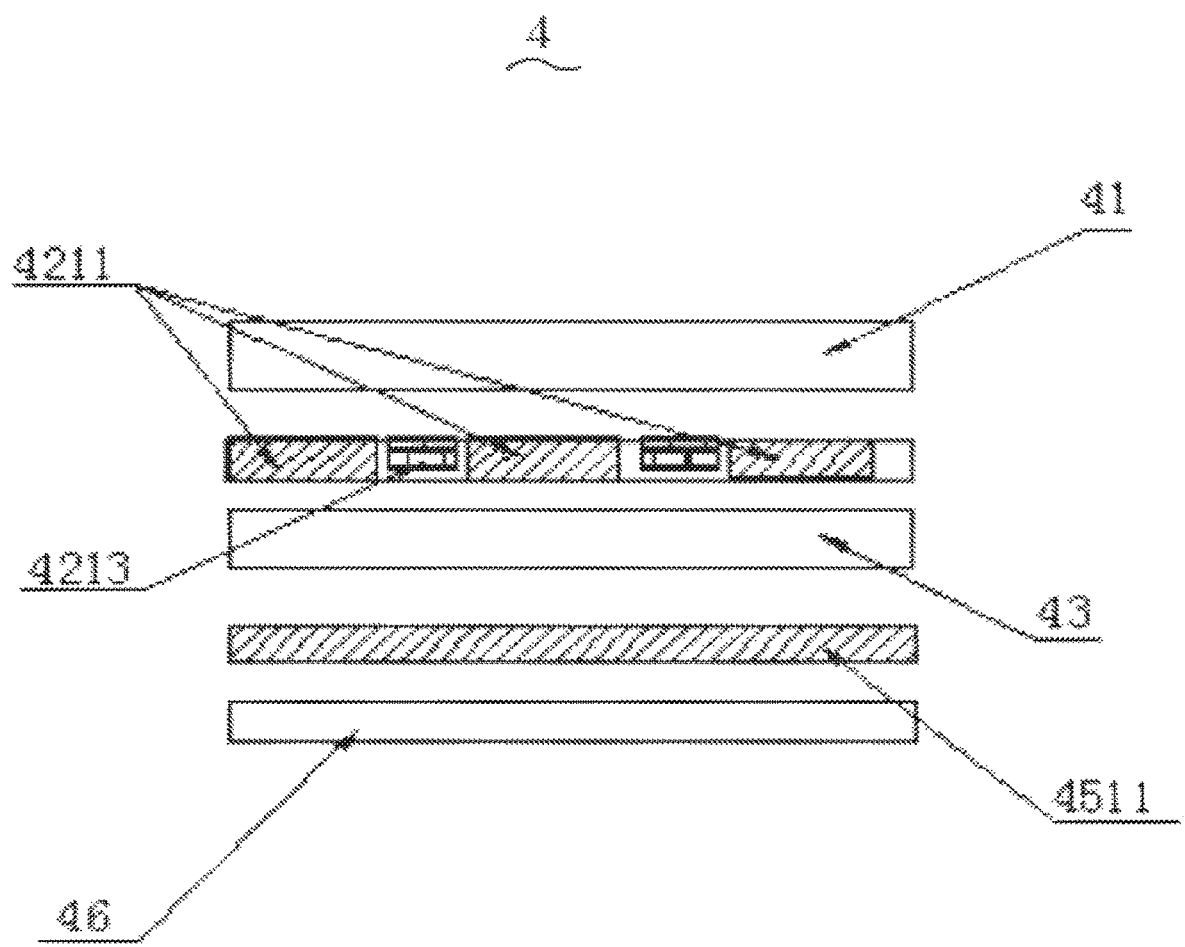
FIG. 15A is a layer structure view of a pressure sensing input equipment according to some embodiments of the present disclosure.
Figure 15B:
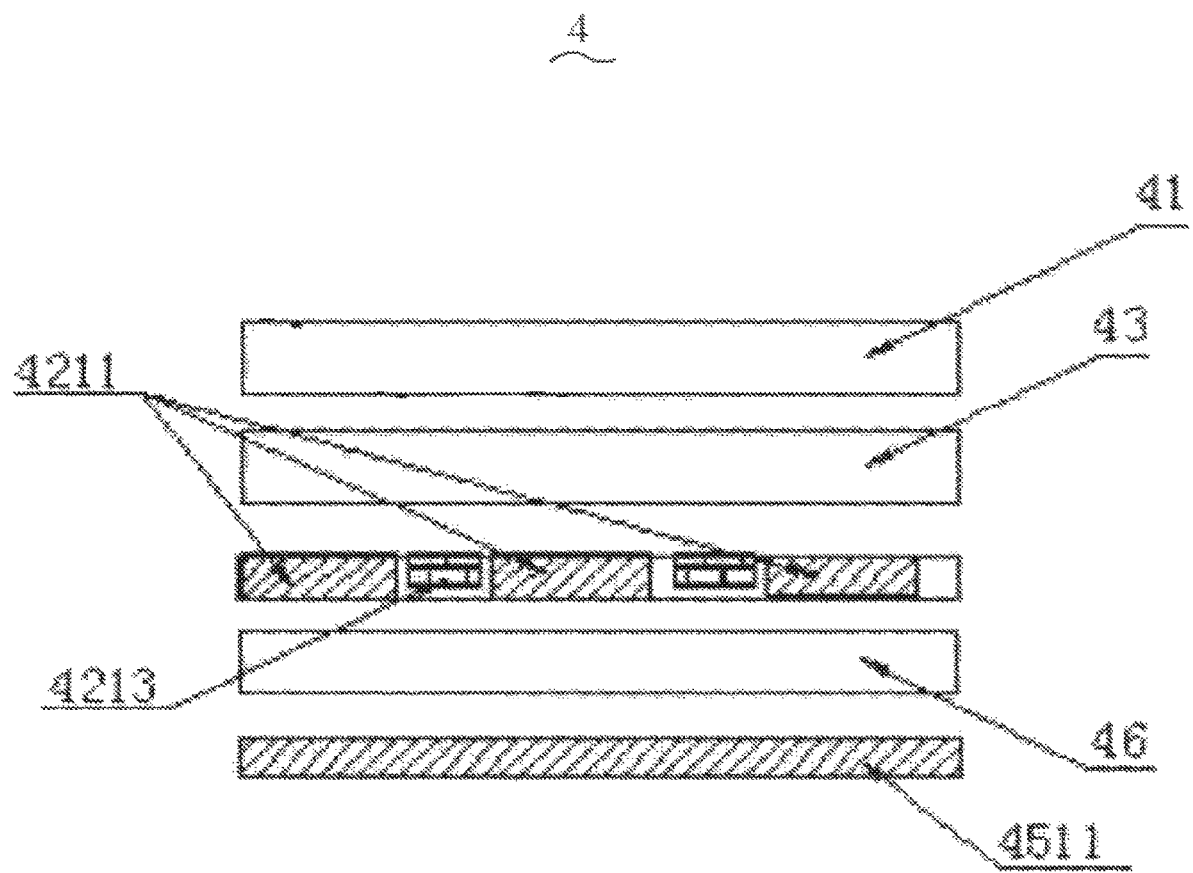
FIG. 15B is a layer structure view of a pressure sensing input equipment according to some embodiments of the present disclosure.

Referring to FIG. 15A, a plurality of first axial touch sensing electrodes 4211 and a plurality of first pressure sensing electrodes 4213 according to some embodiments of the present disclosure are formed on a second surface of a protective board 41, and a plurality of second axial touch sensing electrodes 4511 are formed on a top surface of a second substrate 46. In some embodiments, the second axial touch sensing electrodes 4511 can further be formed on a bottom surface of the first substrate 43. Alternatively, referring to FIG. 15B, the first axial touch sensing electrodes 4211 and the first pressure sensing electrodes 4213 are formed on the top surface of the second substrate 46, and the second axial touch sensing electrodes 4511 are formed on the bottom surface of the second substrate 46. Alternatively, the first axial touch sensing electrodes 4211 and the first pressure sensing electrodes 4213 are formed on the second surface of the protective board 41, and the second axial touch sensing electrodes 4511 are fanned on the top surface of the first substrate 43, in this situation, an insulating layer is disposed between two electrode layers to avoid signal interference.

Figure 16:
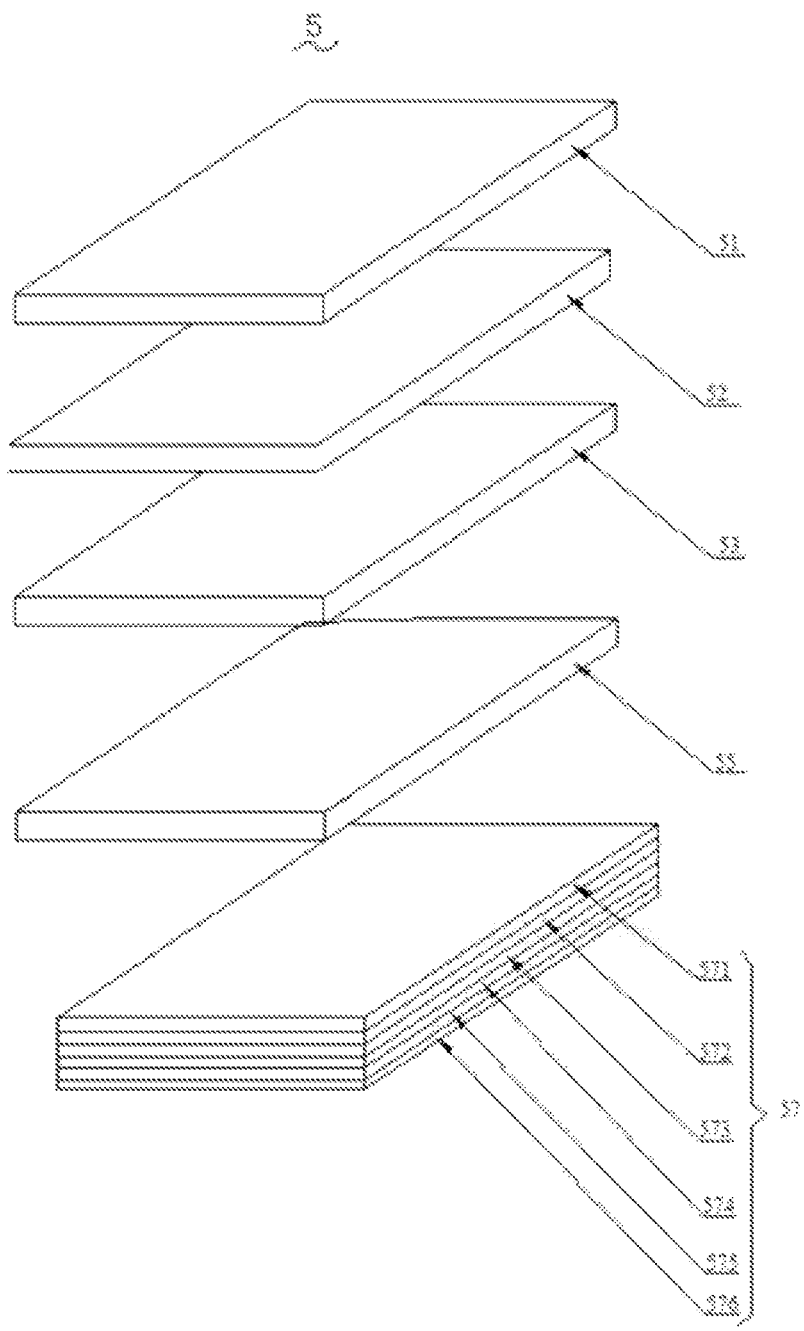
FIG. 16 is an explosion view of a touch module of a pressure sensing input equipment according to some embodiments of the present disclosure.

Referring to FIG. 16, a touch module 5 according to some embodiments of the present disclosure includes a protective board 51, a first electrode layer 52, a first substrate 53, a second electrode layer 55, and a display 57. The first electrode layer 52 is formed on a top surface of the first substrate 53, and the second electrode layer 55 is formed on another surface, e.g., a bottom surface, of the first substrate 53. The present disclosure does not limit the kinds of the display 57. The display 57 may be liquid crystal, organic light emitting diode (OLED), or plasma. The display 57 includes a top polarizer 571, a top substrate 572, a color filter 573, a liquid layer 574, a driving layer 575, and a bottom substrate 576. The top polarizer 571 is disposed on the top substrate 572. The color filter 573 is disposed under the top substrate 572. The color filter 573 includes several filters that filter different colors. The driving layer 675 is disposed on the bottom substrate 576, and includes several thin film transistors (TFT). The liquid layer 574 is disposed between the color filter 573 and the driving layer 575. In some embodiments, the second electrode layer 55 may be disposed between the top polarizer 571 and the top substrate 572, between the top substrate 572 and the color filter 573, between the color filter 573 and the liquid layer 574, between the liquid layer 574 and the driving layer 575, or between the driving layer 575 and the bottom substrate 576.

Comparing to conventional technologies, in the present disclosure, the first axial touch sensing electrodes 1211 and the first pressure sensing electrodes 1213 are alternately arranged on the first electrode layer 12. The first pressure sensing electrodes 1213 are formed in spring shape, and are connected to the Wheatstone bridge circuit 1951, which is better for detecting external pressure magnitude.

Since the first pressure sensing electrodes 1213 are additionally arranged, the distance between the first axial touch sensing electrodes 1211 is adequately reduced, thereby providing sufficient space to the first pressure sensing electrodes 1213, benefiting electrode arrangement.

In practical manufacturing processes, the first axial touch sensing electrodes 1211, the first pressure sensing electrodes 1213, and the second axial touch sensing electrodes 2511 may be formed on different positions, such as a second surface of a protective board (not shown), and the top surface or bottom surface of the first substrate 13. It should be noted that the electrodes do not contact each other to avoid signal interference.

The pressure sensing electrodes 1213 and the axial touch sensing electrodes 1211 along a single direction are arranged in complementarily interleaved, and the area of the axial touch sensing electrodes 1211 is adequately reduce to provide space to the pressure sensing electrodes 1213, such design greatly decreases the wiring difficulty in practical manufacturing process. In addition, since the pressure sensing electrodes 1213 are close to the protective board (not shown), it is further good for the pressure sensing electrodes 1213 to achieve pressure sensing, and increases the detecting accuracy. The touch module 1 of the present disclosure, which keeps products light, thin, and reduces wiring difficulty, achieves double functions of touch sensing and pressure sensing, thereby increasing experience of the user.

The foregoing descriptions are merely preferred embodiments, and do not limit to the present disclosure. Those skilled in the art should realize that such equivalent constructions do not depart from the spirit and scope of the present disclosure, and that they may make various changes, substitutions, and alterations herein without departing from the spirit and scope of the present disclosure.

What is claimed is:

1. A pressure sensing input equipment, comprising:
   a first electrode layer;
   a second electrode layer;
   a first substrate disposed between the first electrode layer and the second electrode layer, wherein:
      the first electrode layer comprises a plurality of first pressure sensing electrodes and a plurality of first axial touch sensing electrodes,
      the first pressure sensing electrodes and the first axial touch sensing electrodes are alternately arranged,
      the first pressure sensing electrodes and the first axial touch sensing electrodes are insulated from each other and do not overlap in a first direction,
      the first pressure sensing electrodes are applied for detecting pressure magnitude,
      the first pressure sensing electrodes comprise a first end part and a second end part opposite to the first end part, wherein each of the first pressure sensing electrodes extends continuously from the first end part to the second end part,
      the second electrode layer comprises a plurality of second axial touch sensing electrodes,
      each of the first axial touch sensing electrodes have a substantially uniform first width,
      each of the second axial touch sensing electrodes have a substantially uniform second width,
      each of the first axial touch sensing electrodes is separated from an adjacent first axial touch sensing electrode of the first axial touch sensing electrodes by a first distance, and
      each of the second axial touch sensing electrodes is separated from an adjacent second axial touch sensing electrode of the second axial touch sensing electrodes by a second distance less than the first distance,
   a pressure sensing chip electrically connected to the first pressure sensing electrodes, wherein after the pressure sensing chip receives pressure, the pressure sensing chip detects an induced resistance variation of the first pressure sensing electrodes to achieve pressure magnitude detection;

a plurality of first wires connected only to the first end part of the first pressure sensing electrodes, wherein each of the first wires is connected to the first end part of only one of the first pressure sensing electrodes; and a plurality of second wires connected only to the second end part of the first pressure sensing electrodes, wherein:

each of the second wires is connected to the second end part of only one of the first pressure sensing electrodes, and the pressure sensing chip is connected to the first pressure sensing electrodes by the first wires and the second wires.

2. The pressure sensing input equipment of claim 1, wherein the first axial touch sensing electrodes and the second axial touch sensing electrodes are applied for detecting multipoint touch position.

3. The pressure sensing input equipment of claim 1, wherein the first width is equal to the second width.

4. The pressure sensing input equipment of claim 1, wherein:

a wire width of the first pressure sensing electrodes is smaller than a wire width of the first axial touch sensing electrodes, and the wire width of the first pressure sensing electrodes ranges from 5 μm to 300 μm.

5. The pressure sensing input equipment of claim 1, wherein:

the pressure sensing chip comprises a Wheatstone bridge circuit, and the Wheatstone bridge circuit detects a resistance variation of the first pressure sensing electrodes after the pressure is received.

6. The pressure sensing input equipment of claim 1, further comprising a protective board, wherein:

the protective board comprises a first surface and a second surface, the first surface is opposite the second surface, the first surface is an operation surface, and the first electrode layer is present between the second surface and the first substrate.

7. The pressure sensing input equipment of claim 6, further comprising a second substrate, wherein the first substrate is present between the protective board and the second substrate.

8. The pressure sensing input equipment of claim 7, wherein the second substrate is between the first electrode layer and the second electrode layer.

9. The pressure sensing input equipment of claim 6, wherein the first electrode layer is in contact with the second surface of the protective board.

10. The pressure sensing input equipment of claim 1, wherein the first electrode layer and the second electrode layer are respectively formed on two opposite surfaces of the first substrate.

11. The pressure sensing input equipment of claim 1, wherein the first width is different than the second width.

12. The pressure sensing input equipment of claim 1, wherein the first width is less than the second width.

13. The pressure sensing input equipment of claim 1, wherein the first pressure sensing electrodes and the first axial touch sensing electrodes do not overlap in a second direction perpendicular to the first direction.

14. The pressure sensing input equipment of claim 13, wherein the first pressure sensing electrodes and the first axial touch sensing electrodes overlap in a third direction perpendicular to the first direction and perpendicular to the second direction.

15. The pressure sensing input equipment of claim 1, wherein a length of a first pressure sensing electrode of the first pressure sensing electrodes, measured from the first end part to the second end part, is longer than a length of a first pressure sensing electrode of the first pressure sensing electrode, measured in a direction perpendicular to the first distance and measured perpendicular to the first direction.

16. A pressure sensing input equipment, comprising:

a first electrode layer;

a second electrode layer;

a first substrate disposed between the first electrode layer and the second electrode layer, wherein:

the first electrode layer comprises a plurality of first pressure sensing electrodes and a plurality of first axial touch sensing electrodes, each of the first pressure sensing electrodes comprises a plurality of substantially rectangular first pressuring sensing electrode projection parts, each of the first axial touch sensing electrodes comprises a plurality of substantially rectangular first axial touch sensing electrode projection parts interleaved with the substantially rectangular first pressuring sensing electrode projection parts such that the first pressure sensing electrodes overlap the first axial touch sensing electrodes in a first direction and in a second direction perpendicular to the first direction, the first pressure sensing electrodes and the first axial touch sensing electrodes are insulated from each other and do not overlap in a third direction perpendicular to the first direction and perpendicular to the second direction, the first pressure sensing electrodes are applied for detecting pressure magnitude, the first pressure sensing electrodes comprise a first end part and a second end part opposite to the first end part, the second electrode layer comprises a plurality of second axial touch sensing electrodes extending in the second direction, each of the second axial touch sensing electrodes comprises a plurality of substantially rectangular second axial touch sensing electrode projection parts extending in the first direction, and the substantially rectangular first axial touch sensing electrode projection parts are interleaved with but do not overlap with the substantially rectangular second axial touch sensing electrode projection parts in the third direction; and a pressure sensing chip electrically connected to the first pressure sensing electrodes, wherein after the pressure sensing chip receives pressure, the pressure sensing chip detects an induced resistance variation of the first pressure sensing electrodes to achieve pressure magnitude detection.

17. The pressure sensing input equipment of claim 16, wherein the substantially rectangular first pressuring sensing electrode projection parts overlap the substantially rectangular second axial touch sensing electrode projection parts in the third direction.

18. The pressure sensing input equipment of claim 16, wherein:

a first substantially rectangular first pressuring sensing electrode projection part of the substantially rectangular first pressuring sensing electrode projection parts extends a first distance in the first direction,
a second substantially rectangular first pressuring sensing electrode projection part of the substantially rectangular first pressuring sensing electrode projection parts extends a second distance in the first direction, and
the second distance is different than the first distance.

19. A pressure sensing input equipment, comprising:
a first electrode layer;
a second electrode layer;
a first substrate disposed between the first electrode layer and the second electrode layer, wherein:
  the first electrode layer comprises a plurality of first pressure sensing electrodes and a plurality of first axial touch sensing electrodes,
  each of the first pressure sensing electrodes comprises a plurality of substantially rectangular first pressuring sensing electrode projection parts,
  each of the first axial touch sensing electrodes comprises a plurality of substantially rectangular first axial touch sensing electrode projection parts interleaved with the substantially rectangular first pressuring sensing electrode projection parts such that the first pressure sensing electrodes overlap the first axial touch sensing electrodes in a first direction and in a second direction perpendicular to the first direction,
  the first pressure sensing electrodes and the first axial touch sensing electrodes are insulated from each other and do not overlap in a third direction perpendicular to the first direction and perpendicular to the second direction,
  the first pressure sensing electrodes are applied for detecting pressure magnitude,
  the first pressure sensing electrodes comprise a first end part and a second end part opposite to the first end part,
  a first substantially rectangular first pressuring sensing electrode projection part of the substantially rectangular first pressuring sensing electrode projection parts extends a first distance in the first direction,
  a second substantially rectangular first pressuring sensing electrode projection part of the substantially rectangular first pressuring sensing electrode projection parts extends a second distance in the first direction, and
  the second distance is different than the first distance; and
a pressure sensing chip electrically connected to the first pressure sensing electrodes, wherein after the pressure sensing chip receives pressure, the pressure sensing chip detects an induced resistance variation of the first pressure sensing electrodes to achieve pressure magnitude detection.

20. The pressure sensing input equipment of claim 19, wherein:
the second electrode layer comprises a plurality of second axial touch sensing electrodes extending in the second direction,
each of the second axial touch sensing electrodes comprises a plurality of substantially rectangular second axial touch sensing electrode projection parts extending in the first direction, and
the substantially rectangular first axial touch sensing electrode projection parts are interleaved with the substantially rectangular second axial touch sensing electrode projection parts.

* * * * *